(12) United States Patent
Pratt et al.

(10) Patent No.: US 10,597,122 B2
(45) Date of Patent: Mar. 24, 2020

(54) EXTENDER FOR HOLDING ACCESSORIES

(71) Applicant: Railblaza Limited, Auckland (NZ)

(72) Inventors: Ross Gregory Pratt, Auckland (NZ); Christopher Ross Pratt, Auckland (NZ)

(73) Assignee: Railblaza Limited, Auckland (NZ)

( * ) Notice: Subject to any disclaimer, the term of this patent is extended or adjusted under 35 U.S.C. 154(b) by 0 days.

(21) Appl. No.: 16/119,035

(22) Filed: Aug. 31, 2018

(65) Prior Publication Data

US 2019/0071153 A1 Mar. 7, 2019

(30) Foreign Application Priority Data

Sep. 5, 2017 (NZ) ........................ 735256

(51) Int. Cl.
| | | |
|---|---|---|
| *B63B 25/00* | (2006.01) | |
| *F16M 11/06* | (2006.01) | |
| *F16M 11/20* | (2006.01) | |
| *F16M 11/08* | (2006.01) | |
| *F16M 11/16* | (2006.01) | |
| *F16M 13/02* | (2006.01) | |

(52) U.S. Cl.
CPC ........... *B63B 25/002* (2013.01); *F16M 11/06* (2013.01); *F16M 11/08* (2013.01); *F16M 11/16* (2013.01); *F16M 11/2042* (2013.01); *F16M 13/02* (2013.01)

(58) Field of Classification Search
CPC ......... Y10T 403/295; Y10T 403/32008; Y10T 403/32; Y10T 403/362; Y10T 403/7066; Y10T 403/32032; Y10T 403/32631; B25J 17/0275; B25J 9/06
See application file for complete search history.

(56) References Cited

U.S. PATENT DOCUMENTS

| | | | | |
|---|---|---|---|---|
| 3,977,645 A | * | 8/1976 | Deely ..................... | F16C 11/00 248/484 |
| 4,402,481 A | * | 9/1983 | Sasaki ..................... | F16M 11/12 248/282.1 |
| 4,458,870 A | * | 7/1984 | Duncan ..................... | A47C 7/70 248/279.1 |
| 4,630,185 A | * | 12/1986 | Copeland ................ | F21V 21/32 362/269 |
| 5,071,279 A | * | 12/1991 | Rutstrom ............... | F16M 11/14 403/114 |
| 5,383,738 A | * | 1/1995 | Herbermann .............. | B25J 9/06 248/288.51 |
| 5,405,347 A | * | 4/1995 | Lee ..................... | A61B 17/6416 606/54 |
| 5,409,269 A | * | 4/1995 | Karlsson ............... | F16C 11/103 285/146.1 |

(Continued)

*Primary Examiner* — Brian D Nash
(74) *Attorney, Agent, or Firm* — Burns & Levinson, LLP; George N. Chaclas

(57) ABSTRACT

An extender for holding boating accessories including at least a first limb and a second limb engaged in elbow relationship such that one can be pivoted with respect to the other about a transverse axis. At least one of the limbs includes a swivel portion that is able to turn about a longitudinal axis. At least one locking part moves longitudinally along a respective one of the limbs between locked and unlocked positions. When the locking part is in the locked position, it prevents the swivel portion turning.

13 Claims, 3 Drawing Sheets

(56) References Cited

U.S. PATENT DOCUMENTS

| | | | | |
|---|---|---|---|---|
| 5,410,944 A * | 5/1995 | Cushman | | B25J 9/14 74/490.05 |
| 5,641,191 A * | 6/1997 | Jia | | B60J 3/02 16/224 |
| 6,158,793 A * | 12/2000 | Castro | | B60R 11/02 224/548 |
| 6,209,835 B1 * | 4/2001 | Walrath | | A47F 5/08 248/276.1 |
| 6,698,963 B1 * | 3/2004 | Parker | | B60G 7/001 403/130 |
| 6,767,153 B1 * | 7/2004 | Holbrook | | F16C 11/0604 403/115 |
| D509,826 S * | 9/2005 | Jobs | | D14/371 |
| 7,156,358 B2 * | 1/2007 | March | | B60R 1/04 248/481 |
| 7,281,693 B2 * | 10/2007 | Chou | | F16M 11/14 248/179.1 |
| 7,311,664 B2 * | 12/2007 | Goodman | | A61B 17/02 600/228 |
| 7,367,740 B2 * | 5/2008 | Lazic | | F16C 11/10 248/125.1 |
| 7,730,565 B1 * | 6/2010 | Masson | | A61G 13/101 5/503.1 |
| 7,753,330 B2 * | 7/2010 | Brief | | B60R 11/0241 248/278.1 |
| 7,774,973 B2 * | 8/2010 | Carnevali | | A01K 97/10 248/276.1 |
| 7,959,120 B2 * | 6/2011 | Liao | | B60R 11/0252 248/122.1 |
| 8,132,291 B2 * | 3/2012 | Tsai | | F16C 11/0604 16/224 |
| 8,602,662 B1 * | 12/2013 | Mans | | F16M 11/041 396/428 |
| 8,613,379 B2 * | 12/2013 | Lee | | B62J 11/00 224/282 |
| 9,309,687 B2 * | 4/2016 | Carnevali | | E04H 12/20 |
| 9,945,510 B1 * | 4/2018 | Reitberger | | F16M 11/40 |
| 9,958,759 B2 * | 5/2018 | Johnson, Sr. | | G03B 17/561 |
| 2003/0138289 A1 * | 7/2003 | Ronsheim | | F16C 11/106 403/90 |
| 2005/0006542 A1 * | 1/2005 | Henning | | F16C 11/10 248/274.1 |
| 2005/0092877 A1 * | 5/2005 | Carnevali | | F16M 11/40 248/160 |
| 2008/0061195 A1 * | 3/2008 | Carnevali | | F16M 11/14 248/125.8 |
| 2008/0296333 A1 * | 12/2008 | Brassard | | B60R 11/02 224/555 |
| 2009/0189033 A1 * | 7/2009 | Lin | | F16B 47/00 248/205.5 |
| 2010/0078536 A1 * | 4/2010 | Galvin | | F16M 11/40 248/231.51 |
| 2010/0160929 A1 * | 6/2010 | Rogers | | A61B 17/29 606/130 |
| 2011/0011910 A1 * | 1/2011 | Hsiao | | B60R 11/0235 224/555 |
| 2011/0257765 A1 * | 10/2011 | Evans | | A61F 2/54 623/24 |
| 2015/0133957 A1 * | 5/2015 | Kostrzewski | | A61B 17/07207 606/130 |
| 2015/0352727 A1 * | 12/2015 | Sato | | B25J 17/00 74/490.05 |
| 2015/0354745 A1 * | 12/2015 | Tarnay | | F16M 11/14 248/371 |
| 2016/0207206 A1 * | 7/2016 | Sato | | B25J 9/1689 |
| 2016/0221197 A1 * | 8/2016 | Claffee | | F16H 25/20 |
| 2019/0175363 A1 * | 6/2019 | Wu | | A61F 2/582 |

\* cited by examiner

EXTENDER FOR HOLDING ACCESSORIES

CROSS-REFERENCE TO RELATED APPLICATION

This application claims priority to New Zealand Patent Application No. 735256, filed Sep. 5, 2017, which is incorporated herein by reference in its entirety.

FIELD OF INVENTION

A preferred form of the subject technology relates to an extender for use in holding watercraft accessories.

BACKGROUND

It is known to mount accessories to watercraft; for example lights, cameras, echo sounders, fish finders, etc. The craft may be motor or paddle powered, for example a launch or kayak. The accessories may be supported by a base such as a Starport™ mount screw fitted to the boat. Such mounts may be obtained from the company Railblaza™ at www.railblaza.com. It is sometimes desirable to increase the space between the accessory and the boat and in such cases an extender arm is used. It is also desirable to be able to angle adjust the disposition of the accessories so that they are not limited to just one position or orientation. It is accordingly an object of a preferred embodiment of the subject technology to go at least some way towards facilitating this. While this object applies to the preferred embodiment it should not be seen as a limitation on the scope of claims expressed more broadly. An object of the subject technology per se is simply to provide a useful choice.

The term "comprising" if and when used in this document in relation to a combination of features should not be seen as excluding the option of additional unspecified features. Such features may or may not be present.

SUMMARY OF THE INVENTION

According to one aspect of the subject technology there is an extender for holding boating accessories, comprising:
- at least a first limb and a second limb engaged in elbow relationship such that one can be pivoted with respect to the other about a transverse (ie sideways) axis;
- at least one of the limbs comprising a swivel portion that is able to turn about a longitudinal (ie long ways) axis; and
- at least one locking part (eg a ring) able to move longitudinally along a respective one of the limbs between locked and unlocked positions;

the arrangement being such when the locking part (eg ring) is in the locked position it prevents the swivel portion turning.

Optionally when the locking part is in the locked position it does not prevent pivoting of one limb with respect to the other about the transverse axis Optionally the locking part is in the form of ring that can be moved forwards and backwards along the longitudinal axis.

Optionally the ring has a series of internal extensions (eg ribs) that are able to be moved into corresponding recesses (eg grooves) of the swivel portion to prevent it from turning, and the ring can then be moved in an opposite direction to remove the extensions (eg ribs) from the recesses (eg grooves) to free the swivel portion for turning.

Optionally one end of the extender has a star shaped connector suitable for engaging a star shaped recess of a supportive mount (eg a star port of something similar).

Optionally one end of the extender has a star shaped recess suitable for receiving a star shaped connector of a boating accessory (eg a sounder, etc).

Optionally there is a third limb engaged in an elbow relationship with one of the other limbs such that the third limb can pivot with respect to that other limb about a further transverse axis, the third limb also having a swivel portion that is able to turn about a longitudinal axis and also having a locking part able to move longitudinally between locked and unlocked positions;

the arrangement being such when the locking part of the third limb is in the locked position it prevents the third limb's swivel portion turning but does not prevent pivoting of the third limb about the transverse axis mentioned for the third limb.

Optionally there is one or more further limbs arranged in the same manner as the third limb.

Optionally a first portion of the first limb is able to swivel with respect to a second portion of that limb, each portion having a series of circumferentially spaced recesses, the locking part comprises a ring with inwardly directed ribs, the ring being adjustable so that the ribs locate within the recesses of both the first and second portions to lock the limb against swiveling and the ring being adjustable so that the ribs engage the recesses of only one of the first and second portions to unlock the limb for swiveling.

DRAWINGS

Some referred embodiments of the subject technology are described below with reference to the accompanying drawings, of which:

DETAILED DESCRIPTION

Figure 1:
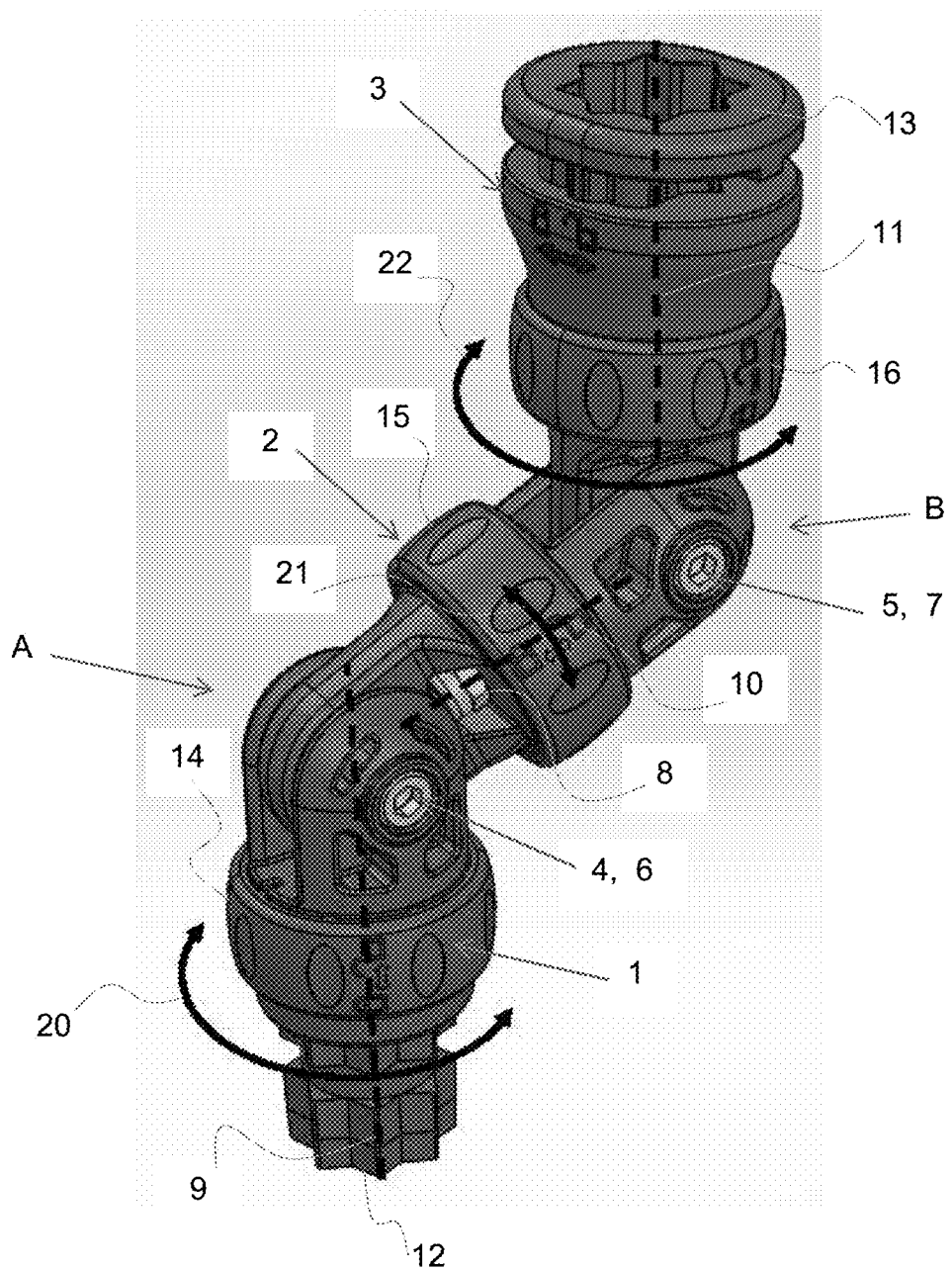
FIG. 1 is an isometric view of an extender arm for boating accessories.

Referring to FIG. 1 the extender has a lower limb 1, a middle limb 2 and an upper limb 3. The lower and middle limbs 1, 2 are able to adjustably pivot with respect to one another about a lower elbow joint 'A'. Similarly the middle and upper limbs 2, 3 are able to adjustably pivot with respect to one another about an upper elbow joint 'B'. The pivoting is in each case achieved by way of transverse bolts 4, 5 held in place by nuts 6, 7.

Each limb is such that its upper portion can rotate with respect to its lower portion by way of a swivel joints. Each swivel joint comprises a longitudinally running bolt held in place by a nut. The bolt and nut for the middle limb 3 is indicated at 8. The axes of the swivel joints are indicated by the dotted lines 9, 10 and 11. When the extender is in the bent or generally 'z' configuration shown in FIG. 1 the swivel axes point in different directions, but when it is straightened they will lay on the same line.

The bottom of the lower limb 1 has a star shaped male connector 12 and the top of the upper limb 3 has a female connector 13. The male connector 12 is formed to lock into a complimentary star shaped recess of a boat mount, for example a Starport™ mount. The female connector 13 is also in the form of a star shaped recess for receiving a complimentary star shaped male connector of a boating accessory.

Because the extender can fold about the two elbow joints 'A', 13', and because the upper portion of each limb can rotate at the swivel joints, boating accessory mounted on the upper limb can be set to a wide variety of positions.

The elbow joints are stiff so that they will only move if subjected to deliberate significant hand force. They and can be tightened or loosened by the nuts 6, 7 as desired and if tightened sufficiently they remain set in place during normal use.

The swivel joints are able to be locked and then unlocked to prevent and allow swivelling as desired. This is achieved by way of locking rings 14, 15 and 16 that can side longitudinally up and down. Each swivel joint incorporates a respective one of the rings. When a ring is in its most downward position the swivel joint is locked against rotation. But the ring is freed for rotation when it is in its most upward position. The ring can be moved back and forth by hand and clicks into place at each of the two positions. By moving the rings to the desired position any one or all of the swivel joints can be independently locked or made free.

Figure 2:
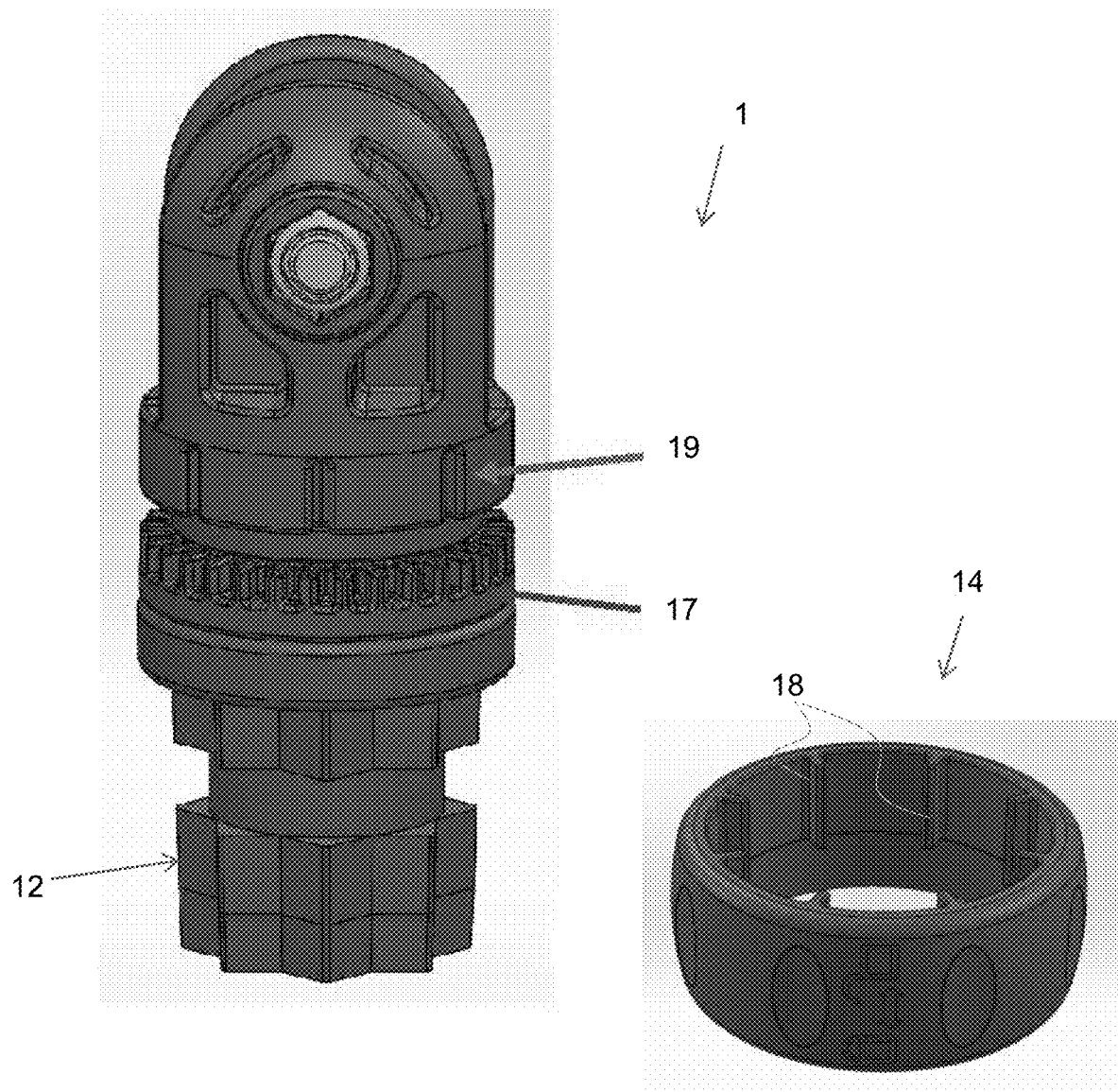
FIG. 2 is an isometric view showing detail of one of the extender's limbs when partly assembled.
Figure 3:
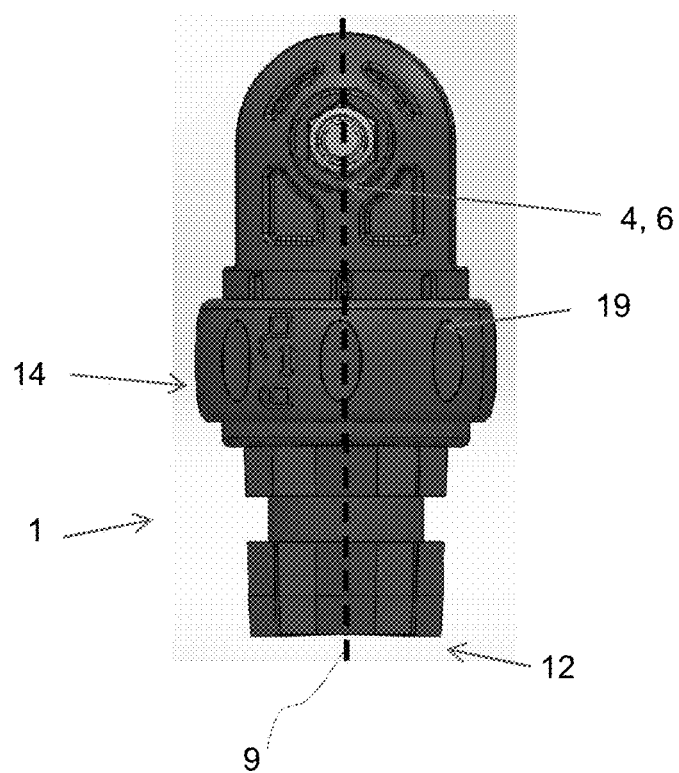
FIG. 3 is an isometric view showing further detail of the limb.

For ease of understanding FIG. 2 shows the swivel joint of the first limb 1 partly assembled. A lower portion of the limb has a circular perimeter that incorporates a series of equally spaced locking slots 17. And the interior of the ring 14 has a series of complimentary ribs 18. The locking ring 14 is fixed to the upper portion of the limb 1 and can be pushed downwards to engage the ribs 18 in some of the locking slots 17. This prevents the lower and upper portions of the limb 1 from rotating with respect to one another. Subsequent unlocking is achieved by moving the ring upwards to free the ribs 18 from the slots 17. The degree of rotation or angle adjustment depends on the number of locking slots 17. In preferred embodiments there are 32 slots to give 32 rotational locking positions for each limb, but this number is not essential.

As shown in FIG. 2 the circumference of the upper portion of each limb has a series of equally spaced slots 19. These guide movement of the ring 14 in that its ribs 18 move upwards and downwards along those slots 19. When the ring is positioned so that its ribs 18 extend lay in the slots 17, 19 simultaneously then the swivel joint is locked.

The curved double arrowhead lines 20, 21, 22 in FIG. 1 illustrate the direction in which each limb 1, 2 and 3 can turn. They can each turn through a full 360°.

While some preferred embodiments of the invention have been described by way of example, it should be understood that modifications and improvements and modifications can occur without departing from the scope of the following claims.

The invention claimed is:

1. An extender for holding boating accessories, comprising:
    at least a first limb and a second limb engaged in elbow relationship such that one can be pivoted with respect to the other about a transverse axis;
    at least one of the limbs comprising a swivel portion that is able to turn about a longitudinal axis; and
    at least one locking part able to move longitudinally along a respective one of the limbs between locked and unlocked positions;
    the arrangement being such when the locking part is in the locked position it prevents the swivel portion turning and does not prevent pivoting of the one limb with respect to the other about the transverse axis.

2. An extender according to claim 1, wherein the locking part is in the form of a ring that can be moved forwards and backwards along the longitudinal axis.

3. An extender according to claim 2, wherein the ring has a series of internal extensions that are able to be moved into corresponding recesses of the swivel portion to prevent it from turning, and the ring can then be moved in an opposite direction to remove the extensions from the recesses to free the swivel portion for turning.

4. An extender according to claim 3, wherein one end of the extender has a star shaped connector suitable for engaging a star shaped recess of a supportive mount.

5. An extender according to claim 4, wherein one end of the extender has a star shaped recess suitable for receiving a star shaped connector of a boating accessory.

6. An extender according to claim 1, wherein there is a third limb engaged in an elbow relationship with one of the other limbs such that the third limb can pivot with respect to that other limb about a further transverse axis, the third limb also having a swivel portion that is able to turn about a longitudinal axis and also having a locking part able to move longitudinally between locked and unlocked positions;
    the arrangement being such when the locking part of the third limb is in the locked position it prevents the third limb's swivel portion turning but does not prevent pivoting of the third limb about the transverse axis mentioned for the third limb.

7. An extender according to claim 5, wherein there is one or more further limbs arranged in the same manner as the third limb.

8. An extender according to claim 1, wherein a first portion of the first limb is able to swivel with respect to a second portion of that limb, each portion having a series of circumferentially spaced recesses, the locking part comprises a ring with inwardly directed ribs, the ring being adjustable so that the ribs locate within the recesses of both the first and second portions to lock the limb against swivelling and the ring being adjustable so that the ribs engage the recesses of only one of the first and second portions to unlock the limb for swivelling.

9. An extender for holding boating accessories, comprising:
    a first limb; and
    a second limb engaged in an elbow relationship to the first limb such that the second limb pivots with respect to the first limb about a transverse axis, the second limb including: a swivel portion mounted to turn about a longitudinal axis; and a locking part moveable longitudinally along the second limb between locked and unlocked positions,
    wherein when the locking part is in the locked position, the locking part prevents the swivel portion from turning and does not prevent pivoting of one limb with respect to the other about the transverse axis.

10. An extender according to claim 9, wherein the locking part is in the form of a ring that can be moved forwards and backwards along the longitudinal axis.

11. An extender according to claim 10, wherein the ring has a series of internal extensions that are able to be moved into corresponding recesses of the swivel portion to prevent the ring from turning, and the ring can then be moved in an opposite direction to remove the extensions from the recesses to free the swivel portion for turning.

12. An extender according to claim 11, wherein one end of the extender has a star shaped connector suitable for engaging a star shaped recess of a supportive mount.

13. An extender according to claim 12, wherein one end of the extender has a star shaped recess suitable for receiving a star shaped connector of a boating accessory.

\* \* \* \* \*